United States Patent [19]
Giegerich et al.

[11] Patent Number: 5,279,464
[45] Date of Patent: Jan. 18, 1994

[54] METHOD OF AND APPARATUS FOR RECYCLING CATALYTIC CONVERTERS

[75] Inventors: Heinz Giegerich, Hanau; Clemens Hensel, Grosskrotzenburg, both of Fed. Rep. of Germany

[73] Assignee: EAR European Autocat Recycling GmbH, Alzenau, Fed. Rep. of Germany

[21] Appl. No.: 2,662

[22] Filed: Jan. 11, 1993

[51] Int. Cl.⁵ ............................................. B02G 23/10
[52] U.S. Cl. ............................... 241/24; 241/DIG. 38
[58] Field of Search ...................... 241/24, 75, DIG.

[56] References Cited

U.S. PATENT DOCUMENTS 4,074,865  2/1978  Gibbon ................................. 241/24
5,058,813  10/1991  Thomas et al. ..................... 241/24 X

FOREIGN PATENT DOCUMENTS 4105224  2/1992  Fed. Rep. of Germany .

*Primary Examiner*—Douglas D. Watts
*Attorney, Agent, or Firm*—Darby & Darby

[57] ABSTRACT

Damaged or spent catalytic converters of the type having a metallic container for foil-shaped carriers of washcoats for catalysts of noble metal are recycled by admitting them into an impact pulverizer which forms a mixture of randomly distributed particles belonging to a first fraction containing dust-like particles of washcoats and catalyst or to a second fraction containing nonmagnetizable particles of containers and magnetizable particles of carriers. A high percentage of the first fraction is withdrawn from the pulverizer with an air stream which also entrains a percentage of the second fraction, primarily particles of carriers; such particles of carriers are separated from the stream in a first step and the particles of the first fraction are thereupon separated from the stream for admission into a collecting receptacle. The remainders of the first and second fractions are evacuated from the pulverizer along a second path, such as by gravity flow, and the mixture of first and second fractions is thereupon classified by pneumatically conveying the remaining particles of the first fraction into the collecting receptacle and by magnetically separating the remaining particles of the carriers from the particles of the containers.

30 Claims, 2 Drawing Sheets

Fig.1
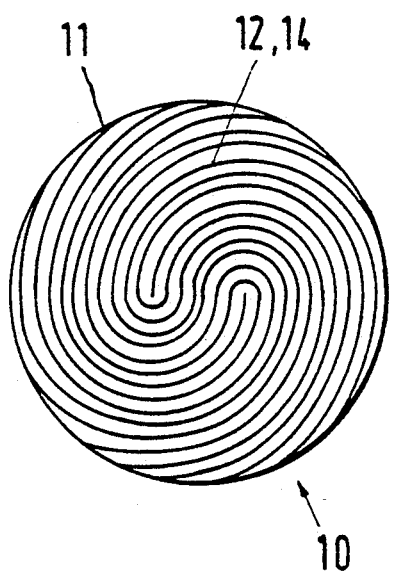
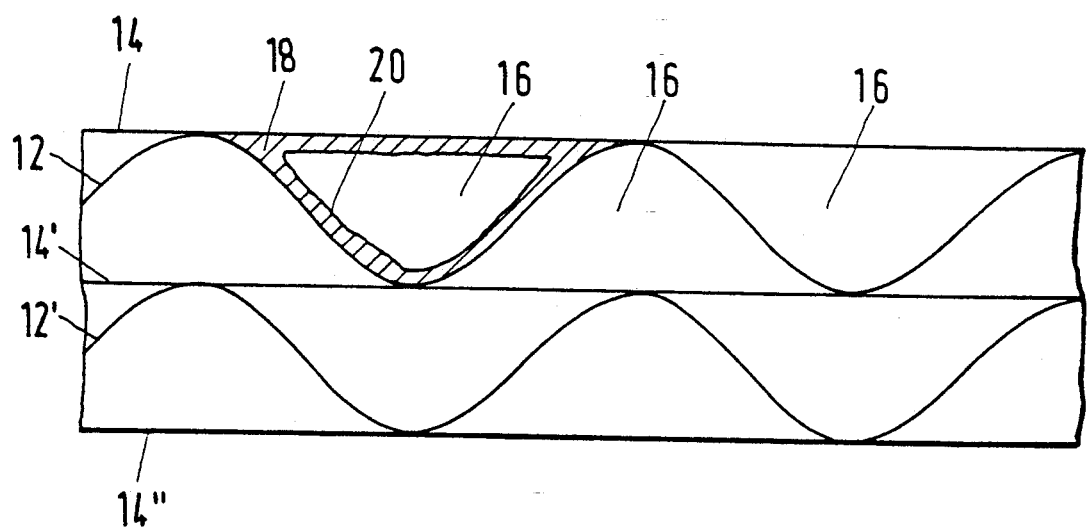
Fig.2

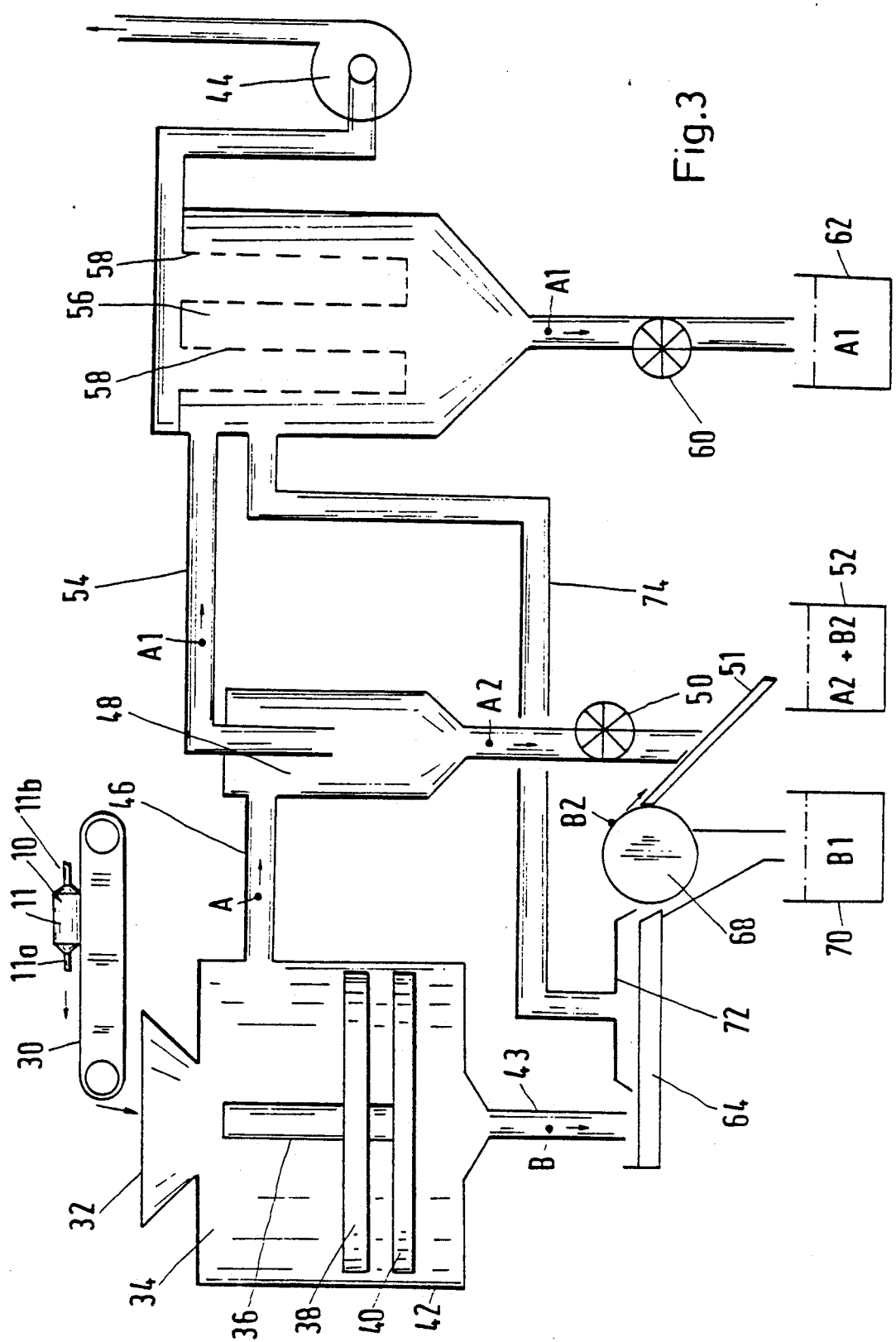

METHOD OF AND APPARATUS FOR RECYCLING CATALYTIC CONVERTERS

BACKGROUND OF THE INVENTION

The invention relates to improvements in methods of and in apparatus for recycling discarded catalytic converters of the type used in motor vehicles. More particularly, the invention relates to improvements in methods of and in apparatus for recycling catalytic converters of the type wherein a metallic container or housing confines normally sheet- or foil-like metallic carriers of a surface-enlarging substrate (called washcoat) for metallic catalysts.

It is known to equip motor vehicles with after-treatment devices for pollutant removal from automotive exhaust, commonly known as catalytic converters, wherein a housing or container (which can serve as a muffler) confines a ceramic body constituting a carrier of catalytic agents, particularly noble metals such as platinum, palladium and rhodium. The catalysts are effective when their temperature reaches a predetermined value. Since the mass of the ceramic body is rather large, the catalysts which are deposited thereon become effective only after a relatively long interval of time following starting of the engine in a motor vehicle. In addition, ceramic carriers are sensitive to mechanical and/or thermal shocks so that they must be installed with a view to avoid vibration and/or abrupt changes of temperature of such converters.

Attempts to overcome the drawbacks of catalytic converters which employ ceramic bodies have led to the development of aftertreatment devices wherein the catalysts are applied to metallic carriers. A catalytic converter embodying metallic carriers of catalysts employs a metallic container or housing with an inlet for exhaust gases and an outlet for treated exhaust gases. The container confines sheet- or foil-like carriers for so-called washcoats which, in turn, carry metallic catalysts. The washcoats are thin coatings which enlarge the surfaces of laminations including the carriers and the washcoats, and the enlarged surfaces carry the catalysts. As a rule, the container and its inlet and outlet are made of special high-quality steel or a nonmagnetic ferrous alloy. The sheet- or foil-like carriers are often made from a ferromagnetic Fe-Cr-Al alloy having a minimal thickness. Flat carriers alternate with corrugated or undulate carriers, and the flat carriers contact the nodes and antinodes of corrugations forming part of the corrugated carriers. Such contacting portions of the flat and corrugated carriers can be soldered or otherwise secured to each other. The coatings of washcoat can be made of gamma-aluminum-oxide, and the exposed surfaces of such coatings are impregnated with noble metals.

An advantage of a metallic converter is that its mass is small (especially when compared with the mass of a ceramic body) so that the entire device is rapidly heated to an optimum temperature as soon as the inlet of the container begins to receive exhaust gases from the engine of a motor vehicle. In other words, the catalytic effect is felt shortly or immediately after the engine is started. Moreover, a metallic converter is less sensitive to mechanical and/or thermal stresses which, in turn, renders it possible to install the converter in the tail pipe much closer to the engine than is advisable for a ceramic converter. Of course, as the metallic converter is rather close to the engine, its temperature is raised by the exhaust gases practically immediately after starting. This, of course, is in line with the dictates and suggestions by environmental protection agencies.

In spite of their aforediscussed important advantages over ceramic converters, metallic converters have failed to find commensurate acceptance in the industry. One of the reasons is believed to be that recycling of such metallic converters is unknown or that the heretofore proposed recycling methods and apparatus are unsatisfactory.

Recycling of converters for use in motor vehicles presently involves mechanical treatment which is followed by chemical treatment serving primarily to recover the active catalysts such as platinum, palladium and rhodium. A converter is ready for recycling when its catalytic activity deteriorates. Furthermore, it is often necessary to recycle certain converters which were damaged as a result of an accident or for any other reason. In many instances, removal of spent or damaged converters from motor vehicles is not carried out with a high degree of care so that the devices which are delivered for recycling often exhibit plugged inlets and/or outlets as well as remnants of tail pipes.

Published Japanese patent application Serial No. 02-209-433 proposes to recycle a metallic catalytic converter without prior removal of the metallic container. The converter is heated in an electric furnace and is thereupon quenched in water. This is intended to result in separation of gamma-aluminum-oxide layers of the washcoats and noble metal catalysts from the foil-shaped carriers and metallic container due to different thermal expansion coefficients of the separated constituents. The mixture of gamma-aluminum-oxide and noble metals is thereupon treated with an aqueous solution of caustic soda which results in dissolution of the washcoat of gamma-aluminum-oxide. The noble metals are thereupon recovered by resorting to a filtering operation. The proposal in the published Japanese patent application merely involves segregation and an increase of the concentration of noble metals. However, the metallic container remains connected with the foil-shaped carriers and thus necessitates additional recycling. Moreover, the just discussed recycling is possible only if the damaged or spent converters are delivered with open inlet and outlet nipples.

OBJECTS OF THE INVENTION

An object of the invention is to provide a method which renders it possible to recycle entire damaged or spent catalytic converters without any preliminary treatment.

Another object of the invention is to provide a method which does not involve any chemical treatment of the converters.

A further object of the invention is to provide a method which renders it possible to recover the entire catalyst or a very high percentage of catalyst without any chemicals and/or other undesirable substances.

An additional object of the invention is to provide a method which renders it possible to classify all or practically all constituents of damaged or spent converters according to the characteristics of their materials.

Still another object of the invention is to provide a method which can be practiced with equal efficiency irrespective of the condition of converters to be recycled.

A further object of the invention is to provide a method which can be practiced for continuous recycling of catalytic converters at a high rate and in a time-saving manner.

Another object of the invention is to provide a method which involves repeated classification of the constituents of metallic catalytic converters to thus ensure the recovery of high percentages of various constituents.

An additional object of the invention is to provide a novel and improved apparatus for the practice of the above outlined method.

Still another object of the invention is to provide the apparatus with novel and improved means for recovering the catalyst or catalysts.

A further object of the invention is to provide a compact apparatus which can recycle metallic catalytic converters without any preliminary treatment.

Another object of the invention is to provide a novel and improved combination of mechanical and pneumatic components for use in the above outlined apparatus.

An additional object of the invention is to provide the apparatus with novel and improved means for processing comminuted particles or fragments of discarded and partially processed metallic catalytic converters.

SUMMARY OF THE INVENTION

One feature of the present invention resides in the provision of a method of recycling catalytic converters wherein a metallic container or housing confines carriers of surface-enlarging substrates (such as washcoats) for metallic catalysts. The improved method comprises the steps of mechanically comminuting the converters into particles forming a mixture of randomly distributed first and second fractions which respectively contain higher and lower percentages of catalysts and exhibit different characteristics such as the size, weight, shape and/or magnetic properties of the particles, and mechanically segregating the first and second fractions from each other on the basis of different characteristics of such fractions.

The catalysts normally consist of or contain noble metals.

The segregating step can be carried out, at least in part, simultaneously with the comminuting step, and such segregating step can include pneumatically classifying the fractions based on their different characteristics (such as size, shape and/or weight).

The comminuting step can include grinding (particularly at least partially pulverizing) the converters, e.g., comminuting the converters in an impact pulverizer.

In accordance with a presently preferred embodiment of the method, the segregating step can comprise pneumatically classifying the fractions of the mixture including entraining at least a major part of the first fraction and a portion of the second fraction in a stream of air or another gaseous fluid, separating the portion of the second fraction from the stream, and thereupon separating the first fraction from the stream. The just mentioned portion of the second fraction can contain primarily comminuted particles of carriers, and the step of separating such portion of the second fraction from the stream can be carried out in a cyclone separator.

The segregating step can include separating particles of the carriers from the first fraction, or such separating step can include magnetically separating particles of carriers and particles of containers from each other.

The mixture can contain particles of the first fraction which adhere to particles of the second fraction, and the segregating step can include agitating the mixture to disengage the adherent particles of the first fraction from particles of the second fraction; the agitating step can include transporting the particles of the second fraction and the adherent particles of the first fraction by a vibratory conveyor. Such segregating step can further comprise pneumatically evacuating the disengaged particles of the first fraction from the particles of the second fraction with a stream of air or another gaseous fluid, and separating the particles of the first fraction from the stream in a dust separator.

It is presently preferred to carry out the segregating step in several consecutive stages. In accordance with a presently preferred embodiment, the segregating step includes separating some particles of the first fraction from the mixture in the course of the comminuting step, and separating additional particles of the first fraction from the mixture subsequent to the comminuting step. Such method can further comprise the step of merging the separated additional particles of the first fraction with the previously separated particles of the first fraction, for example, in the aforementioned dust separator.

Another feature of the present invention resides in the provision of an apparatus for recycling catalytic converters of the type wherein a metallic container (e.g., a container of nonmagnetic material) carries magnetic or magnetizable carriers of surface-enlarging substrates for metallic catalysts. The apparatus comprises means for mechanically comminuting the converters into particles forming a mixture of randomly distributed first and second fractions which respectively contain higher and lower percentages of catalysts, means for withdrawing first portions of the first and second fractions from the comminuting means along a first path, means for evacuating from the comminuting means second portions of the first and second fractions along a second path, and means for separating the first portion of the second fraction from the first portion of the first fraction in the first path.

The withdrawing means can comprise means for pneumatically removing the first portions of the first and second fractions from the comminuting means with a stream of gaseous fluid (such as air) in a first portion of the first path, and the aforementioned means for separating the first portions of the first and second fractions from each other can comprise a dry separator (such as a cyclone separator). The apparatus can further comprise means for separating the first portion of the first fraction from the stream of gaseous fluid in a second portion of the first path downstream of the first portion of such path.

The comminuting means can comprise an impact pulverizer.

The apparatus can further comprise a dust separator which can constitute or include the aforementioned means for separating the first portion of the first fraction from the first path subsequent to separation of the first portion of the second fraction from the first fraction in the first path. The evacuating means of such apparatus can comprise a vibratory conveyor for the second portions of the first and second fractions, and the apparatus can further comprise means for separating the second portion of the first fraction from the second portion of the second fraction in the conveyor, and means (such as a pneumatic conveyor) for transporting the separated second portion of the first fraction to the dust separator which segregates the first portion of the first fraction from the stream of gaseous fluid in the first path. The means for separating the second portion of the second fraction from the second portion of the first fraction and/or for separating first and second constituents of the second portion of the second fraction (for example, fragments of containers and fragments of carriers) from each other can comprise a magnetic separator.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a schematic cross-sectional view of a metallic catalytic converter which can be recycled in accordance with the method and in the apparatus of the present invention;

FIG. 2 is an enlarged view of a detail in the catalytic converter of FIG. 1; and FIG. 3 is a diagrammatic view of an apparatus which embodies the invention and can be utilized for recycling of catalytic converters of the type shown in FIGS. 1 and 2.

DESCRIPTION OF PREFERRED EMBODIMENTS

FIGS. 1 and 2 illustrates a metallic catalytic converter 10 which constitutes but one of a variety of differently shaped and/or differently dimensioned catalytic converters capable of being recycled in accordance with the method of the present invention and in an apparatus of the type shown schematically in FIG. 3. The illustrated converter 10 comprises a cylindrical housing or container 11 having a thickness of approximately 2 mm and being normally made of special high-quality steel. The internal chamber of the container 11 confines sheet- or foil-shaped carriers 12, 14 which together form a package of substantially S-shaped components. The carriers 14 have an undulate or corrugated shape and the carriers 12 are flat, i.e., devoid of corrugations. Each of the foils or carriers 12, 14 has a thickness of approximately 0.05 mm and each of these carriers consists of an Fe-Cr-Al alloy.

FIG. 2 shows portions of two sets of alternating carriers 12, 12' and 14, 14', 14" drawn to a much larger scale. The nodes and antinodes of the undulate or corrugated carriers 12, 12' are bonded (e.g., soldered) to the adjacent portions of the smooth carriers 14, 14' and 14', 14", respectively.

The carriers 12 and 14 define a large number of elongated channels or passages 16 each having a substantially triangular cross-sectional outline and extending from the inlet 11a (FIG. 3) to the outlet 11b (FIG. 3) of the container 11. The channels 16 establish paths for the flow of exhaust gases issuing from the engine of a motor vehicle when a converter corresponding to the converter 10 of FIGS. 1 and 2 is in actual use.

FIG. 2 further shows a portion of a surface enlarging substrate 18 (called washcoat) which is applied to the sides of each carrier and only a small portion of which is shown in FIG. 2. The washcoat 18 consists of gamma-aluminum-oxide and has a large exposed surface which is impregnated with metallic catalysts 20, normally noble metals of the group including platinum, palladium and rhodium.

The apparatus of FIG. 3 is designed to recycle metallic catalytic converters 10 of the type shown in FIGS. 1 and 2. A stream of damaged or spent converters 10 (only one shown in FIG. 3) is transported from a bunker or another suitable source (not shown) by a chain conveyor 30 into the funnel 32 of a device or unit 34 (here shown as an impact pulverizer) which serves as a means for mechanically comminuting the converters 10 into particles forming a mixture A+B of randomly distributed first and second fractions. The first fraction contains a higher percentage of catalysts 20 and the second fraction contains a lower percentage (e.g., zero percentage) of catalysts. The pulverizer 34 employs a rotor 36 which is driven to rotate about a vertical axis, for example, at a speed of 600 RPM. The maximum peripheral speed of the rotor 36 need not exceed 45 meters per second. The rotor 36 carries a preliminary comminuting unit 38 with two impact surfaces which are located opposite each other. The purpose of the preliminary comminuting unit 38 is to mechanically open up the containers 11 of the converters 10 which are delivered by the conveyor 30. The thus opened containers 11 and other parts of the admitted converters 10 are thereupon ground during passage between a grinding ring or wheel 40 and the surrounding wall 42 of the pulverizer 34. This results in the formation of a mixture of particles having different sizes, shapes and/or weights and together constituting the aforementioned first and second fractions respectively containing higher and lower percentages of metallic catalysts 20.

The improved apparatus further comprises means for withdrawing first portions A1 of the first fraction and first portions A2 of the second fraction right from the interior of the pulverizer 34 by pneumatic means and for advancing the thus withdrawn portions A1, A2 (which together form a mixture A) along a first path defined by a pneumatic conveyor including a conduit 46 leading from the housing or casing of the pulverizer 34 into the housing or casing of a cyclone separator 46. The means for establishing the flow of a stream of gaseous fluid (e.g., air) along a first path extending from the interior of the pulverizer 34, through the conduit 46, through the cyclone separator 48, through a second conduit 54 and through a dust separator 56 includes a suction generating device 44 having a suction intake connected to the outlet of the dust separator 56. The suction generating device 44 can include or constitute a radial fan which is designed to draw a gaseous fluid at a rate of more than 10,000 cubic meters per hour. The gaseous fluid enters the housing of the pulverizer 34 through the funnel 32.

The mixture A which leaves the internal chamber of the pulverizer 34 through the conduit 46 contains elongated particles or fragments of carriers 12 and 14 (second fraction) as well as particles of first fraction, namely fragments of washcoats with particles of catalysts adhering thereto. The comminuted washcoats 18 enter the chamber of the cyclone separator 48 in the form of dust. The device 48 separates the portion A2 of the second fraction (primarily fragments of carriers 12, 14) from the portion A1 of the first fraction (primarily or exclusively particles of washcoats 18 with particles of catalysts 20 adhering thereto). The separated particles A2 are evacuated from the cyclone separator 48 through a gate 50 in the form of a cell wheel for delivery into a chute 51 directing the particles of carriers 12, 14 into a collecting receptacle 52. The particles A1 leave the cyclone separator 48 through the conduit 54 and enter the dust separator 56 where the particles are intercepted by bags or otherwise configurated filters 58 which are permeable to gases but do intercept the dust-like particles of the washcoats 18 and the metallic catalysts adhering thereto. The thus separated gaseous fluid flows to the suction generating device 44 and the intercepted particles of the first fraction descend to be evacuated from the dust separator 56 through a rotary gate in the form of a cell wheel 60. The particles A1 are collected in a second receptacle 62. The material which leaves the dust separator 56 at 60 consists practically exclusively of dust-like particles of washcoats 18 and particles of catalysts 20.

The remaining second portions of the two fractions form a mixture B which leaves through an outlet 43 at the bottom of the pulverizer 34 and descends onto a vibratory conveyor 64 serving as a means for breaking the bonds between those particles of the first fraction which tend to adhere to particles B1, B2 of the second fraction. The mixture contains relatively heavy particles B1 including fragments of the metallic containers and certain fragments (B2) of the carriers 12 and 14. The containers are made of a nonmagnetic material and, therefore, those particles B1 of the mixture B by which constitute fragments of the containers 11 bypass a rotary magnetic separator 68 which picks up the magnetic fragments B2 of carriers 12, 14 and delivers them onto the chute 51 for delivery into the receptacle 52 for the particles A2 arriving from the cyclone separator 48. The particles B1 of metallic containers 11 descend into a third collecting receptacle 70.

The apparatus further comprises a pneumatic separating unit employing a hood 72 above the vibratory conveyor 64 and a conduit 74 which delivers particles of washcoats 18 and adhering particles of catalysts 20 into the dust separator 56 where the thus delivered particles merge with the particles A1 and are evacuated through the cell wheel 60. The particles in the conduit 74 constitute those fragments or particles of the first fraction which adhered to the particles B1 and/or B2 of the second fraction after having passed between the grinding or milling wheel 40 and the wall 42, i.e., those particles of the first fraction which were not picked up by the stream of gaseous fluid flowing into the conduit 46.

The outlet 43 of the pulverizer 34 and the conveyor 64 define a second path for the second portions of the first and second fractions, i.e., for the mixture B, and such mixture is then classified at 68 and 72 according to the characteristics of its particles to ensure that the particles B1 constituting fragments of the containers 11 enter the receptacle 70, that the particles A2, B2 constituting fragments of the carriers 12, 14 enter the receptacle 52, and that the particles A1 constituting fragments of washcoats 18 and the catalysts 20 adhering thereto enter the conduit 74 for advancement through the dust separator 56 and cell wheel 60 into the receptacle 62.

The suction generating device 44 can be designed to simultaneously draw adequate quantities of a gaseous fluid through the conduits 46, 54 as well as through the conduit 74.

An important advantage of the improved method and apparatus is that the converters 10 need not be subjected to any preliminary treatment ahead of the comminuting station (impact pulverizer 34). This renders it possible to recycle the converters in a relatively simple and compact apparatus. Furthermore, the improved method and apparatus render it possible to accurately classify the comminuted particles, not only into a first fraction (in the receptacle 62) which contains only fragmentized washcoats 18 and catalysts 20 and a second fraction which contains fragments of containers 11 and carriers 11, 12, but to further classify the second fraction so that the particles B1 of containers are collected in the receptacle 70 and the particles A2, B2 of carriers 11, 12 are collected in the receptacle 52.

Another important advantage of the improved method and apparatus is that the converters 10 need not be subjected to any chemical treatment for the purpose of segregating the catalysts from the particles of containers 11 and carriers 12, 14. This simplifies the recovery of catalysts from the particles of washcoats and simplifies the entire method. The receptacle 62 contains only the catalysts in high concentration and the particles of washcoats, and the quantities of catalysts in the receptacles 52 and 70 are negligible. Moreover, the receptacle 62 does not contain any other substances which would be harmful to the catalysts and/or would complicate the recovery of catalysts from the particles of washcoats.

The method and the apparatus of the present invention take advantage of the differences in characteristics (such as weight, size, shape, magnetic properties and/or others) of particles which are obtained as a result of comminution (such as pulverization in the device 34) of various constituents of the converters to be recycled.

A further important advantage of the improved method and apparatus is that the catalysts can be recovered regardless of whether or not the inlet 11$a$ and/or the outlet 11$b$ of a container 11 which has been dumped into the pulverizer 34 is open or closed. Thus, the conveyor 30 can deliver for recycling metallic converters 10 which are separated from motor vehicles in the customary way, normally by resorting to hydraulic shears which separate the inlet and the outlet of the container 11 with attendant (frequent or invariable) flattening and at least partial closing of the inlet and/or outlet. Such condition of converters 10 does not interfere with efficient and highly accurate classification into three main ingredients, namely particles B1 of comminuted containers 11, particles A2, B2 of comminuted carriers 12, 14 and particles A1 of comminuted washcoats 18 and catalysts 20. Such classification takes place in a single continuous operation normally involving a single-stage comminuting step and preferably a multi-stage mechanical segregating step which includes separation of the aforediscussed first and second fractions from one another and preferably also separation of fragmentized containers 11 from fragmentized carriers 12, 14. As mentioned above, such recycling operation is possible regardless of the condition of inlets 11$a$ and/or outlets 11$b$ because the fact that the inlets and/or outlets are or can be partially or completely flattened (closed) or fully open is of no consequence as far as the two main steps (mechanical comminution and mechanical segregation) are concerned.

The manner of recovering the catalysts from particles A1 which accumulate in the receptacle 62 is well known and need not be described here. The recovery can involve chemical and/or mechanical treatment of the contents of the receptacle 62, e.g., in a manner as known from the art of recovering catalysts from ceramic converters. Such recovery is simplified due to the fact that the treatment in the pulverizer 34 preferably involves comminution of washcoats into particles of dust which can be readily withdrawn from the housing of the pulverizer 34 by pneumatic means and can be further treated in available equipment such as the cyclone separator 48 (to remove the particles A2 of the second fraction) and the dust separator 56 (to remove particles A1 of the first fraction).

The configuration as well as the weight of particles A1 are such that these particles can be readily separated from the remainder of the mixture, which is formed in the housing of the pulverizer 34, by a strong stream of gaseous fluid. The relatively small percentage of comminuted carriers (A2) which are entrained into the cyclone separator 48 with the particles A1 of the first fraction can be readily and accurately segregated for introduction into the receptacle 52. Segregation of a high percentage of the first fraction directly in the pulverizer 34 simplifies the segregation of remaining particles of the first fraction as soon as they are mechanically separated from the particles of the second fraction as a result of advancement by the vibratory conveyor 64. The particles A2 which are entrained from the housing of the pulverizer 34 with the particles A1 to form the mixture A are lightweight fragments of the carriers 12, 14 and/or fragments having a streamlined shape so that they can be readily entrained by the stream of gaseous fluid entering at 32 and leaving the chamber of the pulverizer 34 through the conduit 46. The quantity of particles which form the mixture A entering the conduit 46 and/or the composition of such mixture can be influenced by varying the quantity of gaseous fluid flowing through the conduit 46 per unit of time.

The utilization of an impact pulverizer as a means for mechanically comminuting the converters 10 constitutes a presently preferred and advantageous feature of the improved apparatus. As a rule, comminution of sheet metal parts in an impact pulverizer normally results in the making of a mass of particles having a spherical shape and the same or nearly the same size. It has been discovered that the introduction of converters of the above outlined character into an impact pulverizer or another grinding or pulverizing unit results in the formation of particles having various sizes and/or shapes and/or weights, depending upon the respective constituents of the converters. The results are particularly satisfactory when the comminuting means includes or constitutes an impact pulverizer.

Experiments with the improved apparatus indicate that, if the unit 34 is set up to ensure a relatively long period of dwell of a converter 10 therein and to establish a relatively narrow gap between the grinding wheel 40 and the adjacent wall 42, the containers 11, their inlets and outlets 11a, 11b and (if present) portions of tail pipes yield relatively flat, large and heavy particles B1 having a size in the range of one or more centimeters. The carriers 12 and 14 yield (a) smaller and primarily elongated particles A2 and B2 having a length of up to a few centimeters, and (b) also a percentage of much smaller particles. For example, the particles A2 can be much smaller and much shorter than the particles B2. The washcoats 18 yield very small particles of dust-like consistency. The just described comminuting action of the pulverizer 34 renders it possible to effectively withdraw the major part of the first fraction (particles A1) right from the housing of the unit 34 and in a very inexpensive way, i.e., by the simple expedient of establishing the flow of a stream of gaseous fluid from the funnel 32 to the intake of the suction generating device 44 via conduit 46, cyclone separator 48, conduit 54 and dust separator 56. Thus, the mixture B which leaves the unit 34 through the outlet 43 contains a relatively small or very small percentage of washcoats 18 and catalysts 20, mainly or to a considerable extent those particles A1 which tend to adhere to the particles B1 and/or B2.

The cyclone separator 48 constitutes a presently preferred piece of equipment for segregation of particles A2 of the second fraction from the particles A1 of the first fraction. The separation is rather simple but efficient because the particle size of the first fraction is much more uniform than the size of particles A2, and the weight of particles A2 greatly exceeds or can greatly exceed the weight of particles A1. However, it is equally within the purview of the invention to replace the cyclone separator 48 with other suitable means for effectively segregating the particles A2 of the second fraction from the particles A1 of the first fraction. The same holds true for the dust separator 56. For example, the separator 56 of the type shown in FIG. 3 can be replaced with a suitable sieve, a magnetic separator and/or by a hydraulic separator of any known design.

As a rule, the weight of particles A1 which accumulate in the receptacle 62 is not more than ten percent of the combined weight of converters 10 which must be comminuted to yield a given quantity of particles A1. This is of advantage because only a small percentage of the mass of recycled converters must be subjected to a chemical and/or other treatment in order to recover and refine the metallic catalysts which are obtained from the dust-like particles A1. Moreover, recovery and refining of metallic catalysts involves the consumption of relatively small amounts of energy.

The recovery of remaining particles of the first fraction from the mixture B which leaves the unit 34 via outlet 43 and is advanced by the vibratory conveyor 64 constitutes an optional but desirable feature of the present invention. As already mentioned before, the conveyor 64 loosens those particles A1 of the first fraction which tend to adhere to the particles B1 and/or B2 with a force that suffices to prevent the stream flowing into the conduit 46 from entraining such particles into the cyclone separator 48 and thence into the dust separator 56. Once the hood 72 lifts the loosened or detached particles A1 from the particles B1 and B2, the magnetic separator 68 takes over to automatically classify the remainder of the mixture B by attracting the magnetic particles B2 while the nonmagnetic particles B1 are free to advance into the receptacle 70.

The particles A2 of the second fraction are, but need not always, be admitted into the receptacle 52 for the particles B2. The illustrated apparatus is preferred at this time due to its compactness.

The treatment of particles A1, B1 and B2 in the path which is defined in part by the outlet 43 and conveyor 64 not only results in recovery of all or nearly all particles A1 which did not leave the unit 34 via conduit 46 but also ensures highly accurate and predictable classification of the second fraction of the mixture B, namely into particles B1 which are fragments of the containers 11 and particles B2 which are fragments of the carriers 12, 14 (the same as the particles A2). The combined weight of classified particles B1 and A2, B2 is several times the combined weight of fragments of washcoats 18 and catalysts 20 which form the particles A1 in the receptacle 62.

The nonmagnetic particles B1 can be transported from or with the receptacle 70 directly into a melting furnace without any chemical or other treatment, i.e., it is not necessary to employ solvents before the particles B1 are admitted into the furnace.

The magnetic particles A2 and B2 can be transported from or with the receptacle 52 directly to a melting furnace, e.g., for the making of fresh carriers 12 and/or 14. Such melting need not be preceded by any chemical treatment.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of recycling catalytic converters wherein a metallic container confines carriers of a surface-enlarging substrates for metallic catalysts, comprising the steps of mechanically comminuting the converters into particles forming a mixture of randomly distributed first and second fractions respectively containing higher and lower percentages of catalysts and exhibiting different characteristics including at least one of the characteristics encompassing the size, weight and shape of the particles; and mechanically segregating the first and second fractions from each other based on said different characteristics of the first and second fractions.

2. The method of claim 1, wherein the catalysts contain noble metals and the substrates on the carriers are washcoats.

3. The method of claim 1, wherein said segregating step is carried out, at least in part, simultaneously with said comminuting step.

4. The method of claim 3, wherein said segregating step includes pneumatically classifying the fractions based on the different characteristics thereof.

5. The method of claim 1, wherein said comminuting step includes grinding the converters.

6. The method of claim 5, wherein said grinding step includes comminuting the converters in an impact pulverizer.

7. The method of claim 1, wherein said segregating step comprises pneumatically classifying the fractions of the mixture including entraining at least a major part of the first fraction and a portion of the second fraction in a stream of gaseous fluid, separating said portion of the second fraction from the stream, and thereafter separating the first fraction from the stream.

8. The method of claim 7, wherein said portion of the second fraction contains primarily comminuted particles of carriers.

9. The method of claim 7, wherein said step of separating said portion of said second fraction is carried out in a cyclone separator.

10. The method of claim 7, wherein said step of separating the first fraction from the stream is carried out in a dust separator.

11. The method of claim 1, wherein said segregating step includes separating particles of the carriers from the first fraction.

12. The method of claim 11, wherein said separating step includes magnetically separating particles of carriers and particles of the containers from each other.

13. The method of claim 1, wherein the mixture contains particles of the first fraction which adhere to particles of the second fraction and said segregating step includes agitating the mixture to disengage the adherent particles of the first fraction from particles of the second fraction.

14. The method of claim 13, wherein said agitating step includes transporting the particles of the second fraction and the adherent particles of the first fraction by a vibratory conveyor.

15. The method of claim 14, wherein said segregating step further comprises pneumatically evacuating the disengaged particles of the first fraction from the particles of the second fraction with a stream of gaseous fluid and separating the particles of the first fraction from the stream in a dust separator.

16. The method of claim 1, wherein said segregating step includes separating some particles of the first fraction from the mixture in the course of the comminuting step and separating additional particles of the first fraction from the mixture subsequent to said comminuting step.

17. The method of claim 16, further comprising the step of merging the separated additional particles with the previously separated particles of the first fraction.

18. Apparatus for recycling catalytic converters wherein a metallic container confines carriers of a surface-enlarging substrate for metallic catalysts, comprising means for mechanically comminuting the converters into particles forming a mixture of randomly distributed first and second fractions respectively containing higher and lower percentages of catalysts; means for withdrawing first portions of the first and second fractions from said comminuting means along a first path; means for evacuating from said comminuting means second portions of the first and second fractions along a second path; and means for separating the first portion of the second fraction from the first portion of the first fraction in the first path.

19. Apparatus for recycling catalytic converters wherein a metallic container confines carriers of a surface-enlarging substrate for metallic catalysts, comprising means for mechanically comminuting the converters into particles forming a mixture of randomly distributed first and second fractions respectively containing higher and lower percentages of catalysts; means for withdrawing first portions of the first and second fractions from said comminuting means along a first path; means for evacuating from said comminuting means second portions of the first and second fractions along a second path; and means for separating the first portion of the second fraction from the first portion of the first fraction in the first path wherein said withdrawing means comprises means for pneumatically removing the first portions of the first and second fractions from said comminuting means with a stream of gaseous fluid in a first portion of said first path, said means for separating the first portions of the first and second fractions from each other comprising a dry separator and further comprising means for separating the first portion of the first fraction from the stream of gaseous fluid in a second portion of said first path downstream of said first portion of said first path.

20. The apparatus of claim 19, wherein said comminuting means comprises an impact pulverizer.

21. The apparatus of claim 19, wherein said separating means comprises a cyclone separator.

22. The apparatus of claim 19, further comprising a dust separator having means for extracting the first portion of the first fraction from the first path subsequent to separation of the first portion of the second fraction.

23. The apparatus of claim 22, wherein said evacuating means comprises a vibratory conveyor for the second portions of the first and second fractions, and further comprising means for separating the second portion of the first fraction from the second portion of the second fraction in said conveyor, and means for transporting the separated second portion of the first fraction to said dust separator.

24. The apparatus of claim 23, wherein said transporting means comprises a pneumatic conveyor.

25. The apparatus of claim 23, further comprising means for magnetically separating first and second constituents of the second portion of the second fraction from each other downstream of said conveyor.

26. The apparatus of claim 19, further comprising means for magnetically separating first and second constituents of the second portion of the second fraction from each other in said second path.

27. The apparatus of claim 18, wherein at least one of said means for withdrawing, said means for evacuating, and said means for separating is dependent on at least the size and the weight of said particle.

28. The apparatus of claim 18, wherein the particles of said first path and the particles of said second path comprise particles possessing substantially the same range of size as the particles exiting from said comminuting means.

29. The apparatus of claim 28, wherein the average size of the particles of said first path are smaller than the average size of the particles of said second path.

30. The apparatus of claim 18, wherein the apparatus mechanically comminutes the converters into particles only once prior to withdrawal of said first portion and prior to evacuation of said second portion.

* * * * *